US011208987B2

(12) United States Patent
Stiesdal

(10) Patent No.: US 11,208,987 B2
(45) Date of Patent: Dec. 28, 2021

(54) FLOATING WIND TURBINE AND A METHOD FOR THE INSTALLATION OF SUCH FLOATING WIND TURBINE

(71) Applicant: Stiesdal Offshore Technologies A/S, Give (DK)

(72) Inventor: Henrik Stiesdal, Odense C (DK)

(73) Assignee: STIESDAL OFFSHORE TECHNOLOGIES A/S, Odense C (DK)

(*) Notice: Subject to any disclaimer, the term of this patent is extended or adjusted under 35 U.S.C. 154(b) by 0 days.

(21) Appl. No.: 16/084,817

(22) PCT Filed: Mar. 15, 2017

(86) PCT No.: PCT/DK2017/050076
§ 371 (c)(1),
(2) Date: Sep. 13, 2018

(87) PCT Pub. No.: WO2017/157399
PCT Pub. Date: Sep. 21, 2017

(65) Prior Publication Data
US 2019/0078556 A1  Mar. 14, 2019

(30) Foreign Application Priority Data
Mar. 15, 2016 (DK) .......................... PA 2016 70151
Sep. 27, 2016 (DK) .......................... PA 2016 70761

(51) Int. Cl.
*F03D 13/25* (2016.01)
*B63B 21/50* (2006.01)
*B63B 35/44* (2006.01)

(52) U.S. Cl.
CPC ............ *F03D 13/25* (2016.05); *B63B 21/502* (2013.01); *B63B 35/44* (2013.01);
(Continued)

(58) Field of Classification Search
CPC ....... F03D 13/25; B63B 21/502; B63B 35/44; B63B 2035/446; B63B 2207/02; F05B 2240/43; Y02E 10/727
See application file for complete search history.

(56) References Cited

U.S. PATENT DOCUMENTS 8,118,538 B2  2/2012  Pao
8,657,534 B2 * 2/2014  Jahnig .................... B63B 35/44
                                                        405/223.1
(Continued)

FOREIGN PATENT DOCUMENTS

CN    101965454 A    2/2011
CN    103925172 A    7/2014
(Continued)

OTHER PUBLICATIONS

International Search Report—PCT/DK2017/050076.
(Continued)

*Primary Examiner* — Juan G Flores
*Assistant Examiner* — Sabbir Hasan
(74) *Attorney, Agent, or Firm* — Schmeiser, Olsen & Watts, LLP

(57) ABSTRACT

Provided is a floating wind turbine including a hull, a wind turbine mounted on top of the hull and a counterweight suspended below the hull by a counterweight suspension is described. Also, a method for the installation is described. The counterweight includes one or more counterweight buoyancy tanks. When the internal volume of the buoyancy tanks is filled with air, the total buoyancy of the counterweight is close to or greater than its weight. Hereby it is capable of floating in a towing/maintenance position with moderate or no support in the vertical direction from the hull or other vessels. During towing, the hull substantially has
(Continued)

the character of a barge, substantially relying on a large waterplane area and shallow draft to maintain stability.

19 Claims, 10 Drawing Sheets

(52) U.S. Cl.
CPC ..... *B63B 2035/446* (2013.01); *B63B 2207/02* (2013.01); *F05B 2240/93* (2013.01); *Y02E 10/727* (2013.01)

(56) References Cited

U.S. PATENT DOCUMENTS

| | | |
|---|---|---|
| 2009/0205554 A1 | 8/2009 | Srinivasan |
| 2011/0037264 A1 | 2/2011 | Roddier et al. |
| 2011/0107953 A1 | 5/2011 | Jaehnig |
| 2011/0179986 A1 | 7/2011 | Nielsen |
| 2012/0073487 A1 | 3/2012 | Pantaleon Prieto et al. |
| 2012/0167813 A1 | 7/2012 | Lambrakos et al. |
| 2014/0234105 A1 | 8/2014 | Tolo |
| 2015/0044045 A1 | 2/2015 | Menendez Ivarez |
| 2015/0181424 A1 | 6/2015 | Hardy |

FOREIGN PATENT DOCUMENTS

| | | |
|---|---|---|
| CN | 104632549 A | 5/2015 |
| EP | 2410176 A2 | 1/2012 |
| EP | 2639452 A1 | 9/2013 |
| GB | 2378679 A | 2/2003 |
| JP | 2015006884 A | 1/2015 |
| WO | 03004869 A1 | 1/2003 |
| WO | WO03004869 A1 | 1/2003 |
| WO | 2009131826 A2 | 10/2009 |
| WO | WO2009131826 A2 | 10/2009 |
| WO | 2010018359 A2 | 2/2010 |
| WO | WO2010018359 A2 | 2/2010 |
| WO | 2013048257 A1 | 4/2013 |
| WO | WO2013048257 A1 | 4/2013 |
| WO | 2013083358 A1 | 6/2013 |
| WO | WO2013083358 A1 | 6/2013 |
| WO | 2015181424 A1 | 12/2015 |
| WO | WO2015181424 A1 | 12/2015 |

OTHER PUBLICATIONS

Written Opinion—PCT/DK2017/050065.
Danish Search Report dated Oct. 11, 2016 for Application PA 2016 70151.
"How to install a TLP Substructure for offshore Wind? TLPWIND® Case Study", presented at the EWEA Offshore 2015 Conference by Iberdrola Ingeneria y Construcciòn.
"Pelastar Installation and Maintenance" presented by Glosten Associates.
International Search Report—PCT/DK2017/050076 dated Apr. 5, 2017.
Written Opinion—PCT/DK2017/050065 dated Apr. 5, 2017.
Supplementary European Search Report dated Sep. 4, 2019 for Application No. EP 17 76 5894.

\* cited by examiner

FLOATING WIND TURBINE AND A METHOD FOR THE INSTALLATION OF SUCH FLOATING WIND TURBINE

CROSS-REFERENCE TO RELATED APPLICATIONS

This application claims priority to PCT Application No. PCT/DK2017/050076, having a filing date of Mar. 15, 2017, which is based on DK Application No. PA 2016 70761, having a filing date of Sep. 27, 2016 and DK Application No. PA 2016 70151, having a filing date of Mar. 15, 2016, the entire contents all of which are hereby incorporated by reference.

FIELD OF TECHNOLOGY

The following concerns a floating offshore foundation for a wind turbine, and installation and maintenance methods for the floating offshore foundation.

More specific, embodiments of the invention concerns a floating wind turbine comprising a hull, a wind turbine mounted on top of the hull and a counterweight suspended below the hull by means of counterweight suspension means or a counterweight suspension.

Moreover, embodiments of the invention concerns a method for the installation of a floating wind turbine comprising a hull, a wind turbine mounted on top of the hull and a counterweight suspended below the hull by means of counterweight suspension means or a counterweight suspension.

Moreover, embodiments of the invention concerns method for the maintenance of a floating wind turbine comprising a hull, a wind turbine mounted on top of the hull and a counterweight suspended below the hull by means of counterweight suspension means or a counterweight suspension.

BACKGROUND

Traditionally, offshore wind turbines are installed on bottom-mounted foundations in relatively shallow water. A water depth of 40 to 50 m is normally considered the limit for such bottom-mounted foundations.

In many areas of the world, sufficient suitable offshore areas with water depths of 50 m or less are not available for deployment of offshore wind power to the desired extent. Here, floating foundations for wind turbines will be required.

A variety of different floating foundation concepts are possible for use with offshore wind turbines. The three primary concepts are spar buoys, semisubmersibles and TLPs (Tension Leg Platforms). Each of these primary concepts has its advantages and limitations.

A spar buoy maintains stability from a deep draft combined with ballast. It is the simplest floating foundation concept, typically consisting of a simple air-filled, floating tube which is kept vertical in the water by ballasting at the bottom. Suitably dimensioned, a spar buoy can support the weight and loads from a large wind turbine while maintaining a near-vertical position. Typically, the function of the mooring lines is only to maintain position and preventing drifting. Some spar buoy designs seek to achieve additional benefits from taut mooring lines; these designs have not yet been tested in practice.

The simplicity of the spar buoy concept makes it inherently attractive. However, the draft poses major challenges during the installation and transportation phases. Due to the motion of the sea it is generally not considered feasible to install wind turbines on floating foundations under ocean conditions at their final location, and therefore floating wind turbines are normally installed at quayside using land-based cranes, or in sheltered waters using floating cranes. Spar buoys generally have drafts larger than 50 m, some designs even have drafts larger than 100 m, and this effectively prevents quayside wind turbine installation using land-based cranes. Therefore, wind turbines are normally installed on spar buoy floating foundations in sheltered waters, such as deep fjords, using floating cranes. While it is fairly easy in a few countries, e.g. Norway to find sheltered waters with sufficient depth to permit wind turbine installation using a floating crane, in many parts of the world such sheltered waters with sufficient depth are not available. Furthermore, even where such sheltered waters with sufficient depth are actually available in a region, the presence of ridges or shoals in the transportation corridor between the point of installation and the desired offshore locations will often effectively prevent the utilization of such sheltered waters for turbine installation. These limitations caused by the deep draft of a spar pose a significant problem for the spar buoy concept.

One solution to the turbine installation problem with spar buoy floaters is to install the turbine while the spar buoy is in an inclined position, preferably in an almost horizontal position. WO2010/018359 discloses an installation method based on such near-horizontal orientation of the spar buoy. Here, the near-horizontal position is maintained through the attachment of a temporary buoyancy device connected to the bottom of the spar buoy. With this arrangement the turbine can be installed at quayside in the near-horizontal position using land-based cranes. After towing to the desired offshore location, the spar buoy is brought to its final, vertical position through gradual disengagement of the temporary buoyancy device.

WO2013/048257 discloses another installation method based on such near-horizontal orientation of the spar buoy. Here, the near-horizontal position is maintained through the connection of the spar buoy to a supplementary buoyancy device, where the connection is arrangement with a rotary coupling device which permits the change of the orientation of the spar buoy and the wind turbine mounted on the spar buoy. The orientation can be changed from near-horizontal during turbine installation and towing to the desired location. After towing to the desired offshore location, the spar buoy can be brought to its final, vertical position through rotation of the rotary coupling.

Methods like those disclosed in WO2010/018359 and WO2013/048257 inherently assume that a wind turbine can be placed in a near-horizontal orientation. This is generally not the case for large wind turbines, however. Significant parts of the equipment used in wind turbines, e.g. controller enclosures, transformers, etc. are suited for normal, vertical orientation only, and in addition some of the structural components will need to be of larger dimensions to accommodate the gravity loads in an unusual direction not otherwise experienced. Lubricants, coolants and other fluids pose a special problem; seals in bearings, gearboxes, hydraulics, expansion tanks, will need to be of special design to allow for near-horizontal orientation. As a consequence of these factors, spar buoy installation methods based on near-horizontal orientation of the wind turbine are generally not attractive.

A semisubmersible floating foundation obtains stability from a large waterplane area at a moderate draft, in combination with ballast which ensures a relatively low center of gravity. The semisubmersible concept is not as simple as the spar buoy concept, but it has the advantage of shallow draft. The shallow draft allows turbine installation at quayside using land-based cranes, and it also poses few challenges during towing to the desired offshore location. As for the spar buoy concept, the function of the mooring lines is only to maintain position and preventing drifting.

The relative simplicity of the semisubmersible concept makes it inherently attractive. However, the stability concept, which is based on differential buoyancy arising as a consequence of heel, leads to considerable heeling angles during turbine operation due to the overturning moment created by the large lateral forces acting on the turbine rotor.

WO2009/131826 discloses an arrangement whereby the heeling angle during turbine operation can be reduced with a ballast control system. The floating foundation is fitted with a set of pumps and valves that is used to redistribute water ballast between the three main columns comprising the stabilizing body of the foundation. Through redistribution of water ballast the overturning moment created by the large lateral forces acting on the turbine rotor can be offset by an overturning moment in the opposite direction created by the moveable ballast.

The arrangement disclosed in WO2009/131826 has obvious disadvantages. Firstly, through the introduction of active sensor and pumping systems a new level of complexity is introduced, inherently violating the fundamental principle that due to the challenges in accessibility unmanned offshore structures should have as few active systems as possible. Secondly, since the masses that need to be redistributed are significant, measured in hundreds or thousands of tons, the balancing system will be semi-static, typically with time constants on the order of minutes even when very large pumps are used. Consequently, transient changes in the overturning moment created by the large lateral forces acting on the turbine rotor cannot be balanced.

U.S. Pat. No. 8,118,538 discloses an alternative way of reducing the heeling angle during turbine operation due to the overturning moment created by the large lateral forces acting on the turbine rotor. A counterweight is mounted some way below the floating platform, and it essentially acts as a keel. In further embodiments the counterweight is connected to adjustable anchor lines and serves to tighten these lines.

While the arrangement disclosed in U.S. Pat. No. 8,118, 538 serves the purpose of reducing the heeling angle, the mounting method outlined is complicated. Offshore operations include connecting the counterweight cables on a winch to the counterweight, following which the weight is lowered under the platform to take up the slack in the cables. Following this, assemblers will release the winch stops and complete lowering the weight below the platform to complete the installation. This sequence of events requires considerable efforts offshore, and it requires the platform to be fitted with winches having sufficient capacity to lower the counterweight in a safe manner. The complexity of the operations and the cost of the winches make this arrangement unattractive.

A TLP (Tension Leg Platform) obtains stability through a balance between excess buoyancy and mooring line tension. The TLP concept is not as simple as the spar buoy or the semisubmersible, since the installation method involves the submersion of the main buoyant part of the platform a certain distance below the surface prior to attachment to the tethers connected to the anchors. This submersion process will typically cause the platform to become unstable, since the waterplane area will not be of sufficient dimension and distribution to ensure stability.

The document "How to install a TLP Substructure for offshore Wind? TLPWIND@Case Study", presented at the EWEA Offshore 2015 Conference by Iberdrola Ingeneria y Construcciōn provides a good overview of the state of the art in installation of TLPs.

Three alternatives are presented. Solution A comprises an ad-hoc installation barge with a footprint on the bottom that matches with the platform shape. Fixation between the platform and the barge is achieved through hydrostatic forces. Completion of the installation on site requires considerable technical arrangements, such as sliding guides and winches.

Solution B comprises temporary buoyancy modules mounted on the platform. While fixed to the platform, these buoyancy modules transform the platform into a semisubmersible. Maintenance of a waterplane area during towing and submersion ensures the necessary stability, and after attachment to the tethers the temporary buoyancy tanks can be removed and re-used. This solution has the disadvantage that the towing resistance is significantly increased, reducing the weather window for installation. Furthermore, the handling and release of the temporary buoyancy elements requires considerable offshore operations.

Solution C comprises a U-shaped semisubmersible barge supporting the TLP during towing. At installation the barge is submerged with the TLP, maintaining stability through a large waterplane area created with fixed structures on the semisubmersible barge. This solution has the benefit of easy towing and safe, simple offshore operations, but it has the very substantial drawback that the semisubmersible barge is a special vessel of considerable dimensions, which inherently leads to higher costs.

CN 103925172 discloses a solution comprising a variant of temporary buoyancy tanks. Prismatic tanks are fitted to the structure of the floater, and through connection with both the radial and the vertical braces the temporary buoyancy tanks can obtain good structural connection to the body of the floater. The problem remains, however, that the removal of the temporary tanks after the connection of the TLP to the tethers is a complicated offshore operation with significant risks of damage to the floater and/or the temporary tanks during the operation. Furthermore, additional costs are associated with the purpose-built temporary tanks.

The document "Pelastar Installation and Maintenance" presented by Glosten Associates outlines the installation process for a TLP using a support barge. The installation process is facilitated by the use of a spud system where the spuds (elongated steel boxes) can be moved vertically by a winch and cable system. The bottom end of each spud contains a tip that locks into a recess in the tendon arms. Once locked, the fully assembled floating turbine and barge act as one stable unit, able to withstand the rough waters and high winds of offshore transits and installation sites. Once positioned over the installation site, the spuds push the floating turbine to its installation draft for tendon hookup. This arrangement has the advantage that towing and installation can be carried out in an efficient and safe manner, but as for Solutions A and C in the Iberdrola document, the solution has the very substantial drawback that the installation barge is a special vessel of considerable dimensions, which inherently leads to higher costs.

WO 2015181424 A1 discloses a floating wind turbine comprising a floating base. In this construction a counterweight is used which is hollow and which may be filled with air or may be flooded. In this construction the installation of the TLP is difficult as the stability during lowering is unsecure. After the use during the installation the counterweight is not used for influencing on dynamic response of the foundation.

None of the prior art documents disclose a combination of a counterweight and a TLP configuration.

SUMMARY

An aspect relates to a floating offshore foundation and a method for installation of such foundation that avoids the above drawbacks.

This aspect can be achieved with a floating wind turbine described in the introduction and being peculiar in that:
  The counterweight comprises one or more counterweight buoyancy tanks;
  The counterweight buoyancy tanks have dimensions such that when the internal volume is filled with air or another gas, the total buoyancy of the counterweight is close to or greater than its weight, making it capable of floating in a towing/maintenance position with moderate or no support in the vertical direction from the hull or other vessels;
  When the counterweight buoyancy tanks are partly or completely flooded with water, the counterweight will sink to an installed position at a level determined by the counterweight suspension; and
  The counterweight suspension are separately or jointly capable of transferring both forces and moments to the hull, thereby enabling the counterweight to stabilize the hull when the counterweight is in its installed position.

In a further aspect the floating wind turbine is peculiar in that after installation the floating foundation is functionally a spar buoy.

In a further aspect the floating wind turbine is peculiar in that after installation the floating foundation is functionally a semisubmersible.

In a further aspect the floating wind turbine is peculiar in that after installation the floating foundation is functionally a tension leg platform.

In a further aspect the floating wind turbine is peculiar in that the counterweight suspension means or counterweight suspension comprise telescopic tubes.

In a further aspect the floating wind turbine is peculiar in that the counterweight suspension means or counterweight suspension are supplemented with or replace by a telescopic center tube.

In a further aspect the floating wind turbine is peculiar in that the counterweight is shaped as a polygon, supported by counterweight suspension means or counterweight suspension attached to the corners of the polygonal counterweight, and where each corner of the polygonal counterweight is attached through the counterweight suspension means or counterweight suspension to minimum two separate attachment points on the hull.

In a further aspect the floating wind turbine is peculiar in that the attachment of the counterweight suspension means or counterweight suspension to the polygonal counterweight is separated from the center of gravity of the polygonal counterweight by a distance which is equal to or larger than half of the distance from the center of gravity of the hull to the attachment of the counterweight suspension means to the hull.

In a further aspect the floating wind turbine is peculiar in that the counterweight is attached to the hull during towing.

In a further aspect the floating wind turbine is peculiar in that the static and dynamic response of the floating foundation can be adjusted before installation through a combination of adjustment of i) ballasting of the counterweight buoyancy tanks, ii) ballasting of the hull, and/or iii) adjustment of the installed depth of the counterweight.

In a further aspect the floating wind turbine is peculiar in that the static and dynamic response of the floating foundation can be adjusted after installation through a combination of adjustment of i) ballasting of the counterweight buoyancy tanks, and ii) ballasting of the hull.

The method for simple installation of a floating foundation for a wind turbine is in a first aspect peculiar in that it comprises the steps of:
  Filing buoyancy tanks of the counterweight partly or completely filled with air or another gas;
  Attaching the counterweight to the hull prior to towing;
  Towing the counterweight with the hull to a desired offshore position;
  Flooding the counterweight buoyancy tanks partly or completely with water when a desired offshore position has been reached,
  Permitting the counterweight to sink to an installed position at a level determined by the counterweight suspension means; and
  Transferring forces and moments to the hull by means of the counterweight suspension means which are separately or jointly capable of transferring both forces and moments to the hull, thereby enabling the counterweight to stabilize the hull when the counterweight is in its installed position.

The method for simple installation of a floating foundation for a wind turbine is in a further aspect peculiar in that it comprises the steps of:
  Filling buoyancy tanks of the counterweight partly or completely with air or another gas before launch and towing;
  Towing the hull and the counterweight to a desired offshore position;
  Attaching the counterweight to the hull when a desired offshore position has been reached;
  Flooding the counterweight buoyancy tanks partly or completely with water,
  Permitting the counterweight to sink to an installed position at a level determined by the counterweight suspension means; and
  Transferring forces and moments to the hull by means of the counterweight suspension means which are separately or jointly capable of transferring both forces and moments to the hull, thereby enabling the counterweight to stabilize the hull when the counterweight is in its installed position.

The method for the maintenance of a floating wind turbine comprising a hull is peculiar in that it comprises the steps of:
  Raising the hull from an installed position to a maintenance position by partly or completely filling the buoyancy tanks of the counterweight with air or another gas;
  Carrying out maintenance; and
  Flooding the counterweight buoyancy tanks partly or completely to lower the hull to an installed position.

The following relates to a floating foundation for a wind turbine. The foundation comprises a hull capable of supporting the mass of the wind turbine and also capable of maintaining stability when supporting the mass of the wind turbine during the wind turbine installation and the subsequent towing to the desired offshore location. During towing, the hull substantially has the character of a barge, substantially relying on a large waterplane area and shallow draft to maintain stability.

The floating foundation furthermore comprises a separate counterweight which is attached to the hull and which is fitted with buoyancy means enabling it to float along with the hull during towing.

When the floating foundation has been towed to the desired offshore location, the counterweight is lowered to a selected position under the hull where it is kept suspended by suitable connectors attached to the hull. In this position the counterweight acts as a keel, stabilizing the foundation.

The foundation according to embodiments of the invention has all the advantages of a TLP, but unlike conventional TLPs it can be towed to site and lowered into position without any need of special-purpose vessels, temporary buoyancy tanks or any of the other supplementary and cost-adding features used for installation of conventional TLPs. Furthermore, the lowering of the center of gravity relative to a conventional TLP caused by the counterweight helps reduce the amplitude of the vertical forces in the tethers during surge excursions. As a consequence, the necessary pretension of the tethers, which is required to prevent the occurrence of tether slack during the largest surge excursions, can be reduced, leading to cost savings on hull, tethers and anchors.

In addition, the dynamic response of the foundation to excitation from fluctuating wind and wave forces can be adjusted to a larger extent than is possible for a conventional TLP. It is even possible to fine-tune natural periods and centers of gravity and buoyancy after installation of the foundation without the need of ballasting vessels.

In one embodiment the submerged weight of the counterweight, possibly in combination with additional ballasting of the hull, is sufficient to pull the main part of the hull a certain distance below the surface, effectively converting the floating foundation from a barge to a spar buoy. In this embodiment the floating foundation enjoys the benefits of spar buoy foundations, including simple stability and low hydrodynamic loading, while at the same time avoiding the problems with installation and towing which are inherent in normal spar buoy foundations.

In another embodiment the submerged weight of the counterweight is not sufficient to pull the main part of the hull below the surface, but it is sufficient, possibly in combination with additional ballasting of the hull, to exercise a considerable stabilizing effect on the foundation. This effectively converts the floating foundation from a barge to a semisubmersible with a particularly large righting moment compared with conventional semisubmersibles. In this embodiment the foundation enjoys the benefits of semisubmersibles, including simple stability and convenient access with good working areas, while avoiding the relatively large heel angles and/or the necessity of active ballasting systems which are inherent in normal semisubmersible foundations.

In yet another embodiment the submerged weight of the counterweight, possibly in combination with additional ballasting of the hull, is sufficient to pull the main part of the hull below the surface to a desired depth, and it is furthermore possible to subsequently reduce the combined weight of the hull and the counterweight. This arrangement enables a particularly effective process for the connection of a TLP to its tethers. In the installation process according to this embodiment, when the floating foundation has been towed to the desired offshore location, the counterweight is lowered to a suitable position under the hull where it is kept suspended by the means attached to the hull such that the combined weight of the counterweight and the hull is capable of pulling the buoyant hub to a depth that enables connection to the tethers. Following connection to the tethers, the combined weight of the hull and the counterweight is reduced to provide the necessary pretensioning of the tethers, e.g. by partial or complete de-ballasting of the hull. In this embodiment the foundation enjoys the benefits of TLPs, including moderate dimensions and the limitation of heel to very moderate angles, while avoiding the complexities of conventional TLP installation methods.

In yet another embodiment the floating wind turbine is peculiar in that after installation the counterweight rests on the seabed.

In yet another embodiment the method for the installation of a floating wind turbine is peculiar in that the installation method comprises the steps of:

Flooding the counterweight buoyancy tanks with water; and

Permitting the counterweight to sink to an installed position resting at the seabed when a desired offshore position has been reached.

The counterweight is lowered to a position under the hull which corresponds to the difference between the water depth at the installation site and the desired depth of the hull after completion of installation.

Following lowering of the counterweight to its desired position, it is further ballasted and pulls the hull below the surface to the desired depth, at which stage the counterweight rests on the seabed.

This arrangement enables a particularly effective installation arrangement of a TLP, since the pre-installation of anchors and tethers is eliminated. The counterweight replaces pre-installed TLP anchors, and the counterweight suspension means replace pre-installed TLP tethers.

By suitable arrangement of the counterweight and its suspension the TLP will have very limited lateral movements, which not only serve to reduce the tether forces but also eliminate the need for elaborate flex joints at the tether attachments.

BRIEF DESCRIPTION

In the following, examples of preferred embodiments are described, visualized in the accompanying drawings, in which.

DETAILED DESCRIPTION

Figure 1:
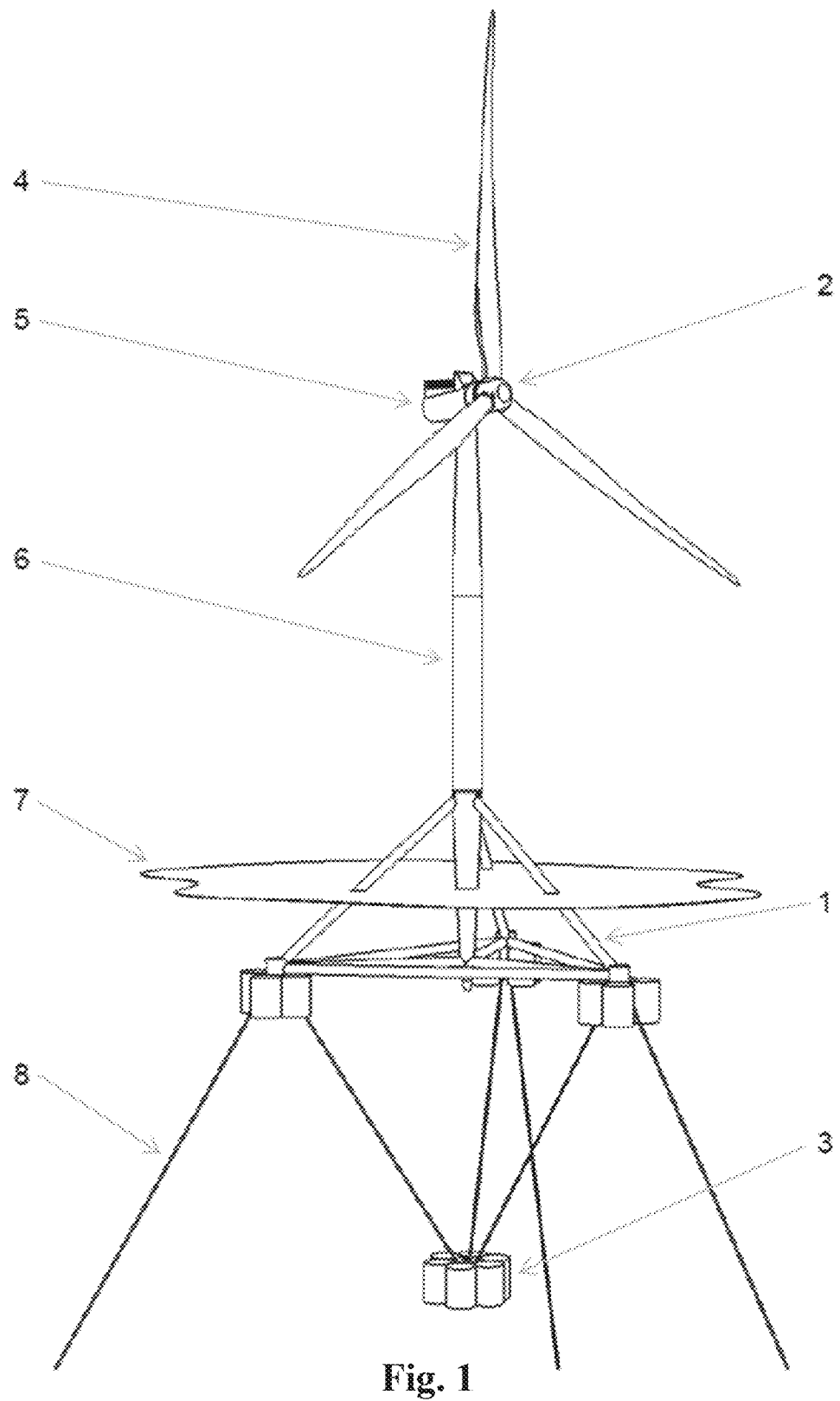
FIG. 1 illustrates a floating wind turbine foundation according to embodiments of the invention, implemented as a spar buoy.

In the figures, similar or corresponding elements are denoted with the same reference numerals.

FIG. 1 shows a floating wind turbine according to embodiments of the invention. A floating foundation hull 1 supports a wind turbine 2 for electric power production. A counterweight 3 is suspended below the hull 1.

The wind turbine 2 comprises a rotor 4 for extracting kinetic energy from the wind, a nacelle 5 containing the equipment needed to support the rotor and to convert the rotational energy delivered by the rotor 4 into electric energy, and a tower 6 supporting the nacelle and the rotor.

The floating foundation hull 1 is partially submerged under the waterplane 7, and it is kept in position by mooring lines 8.

Figure 2:
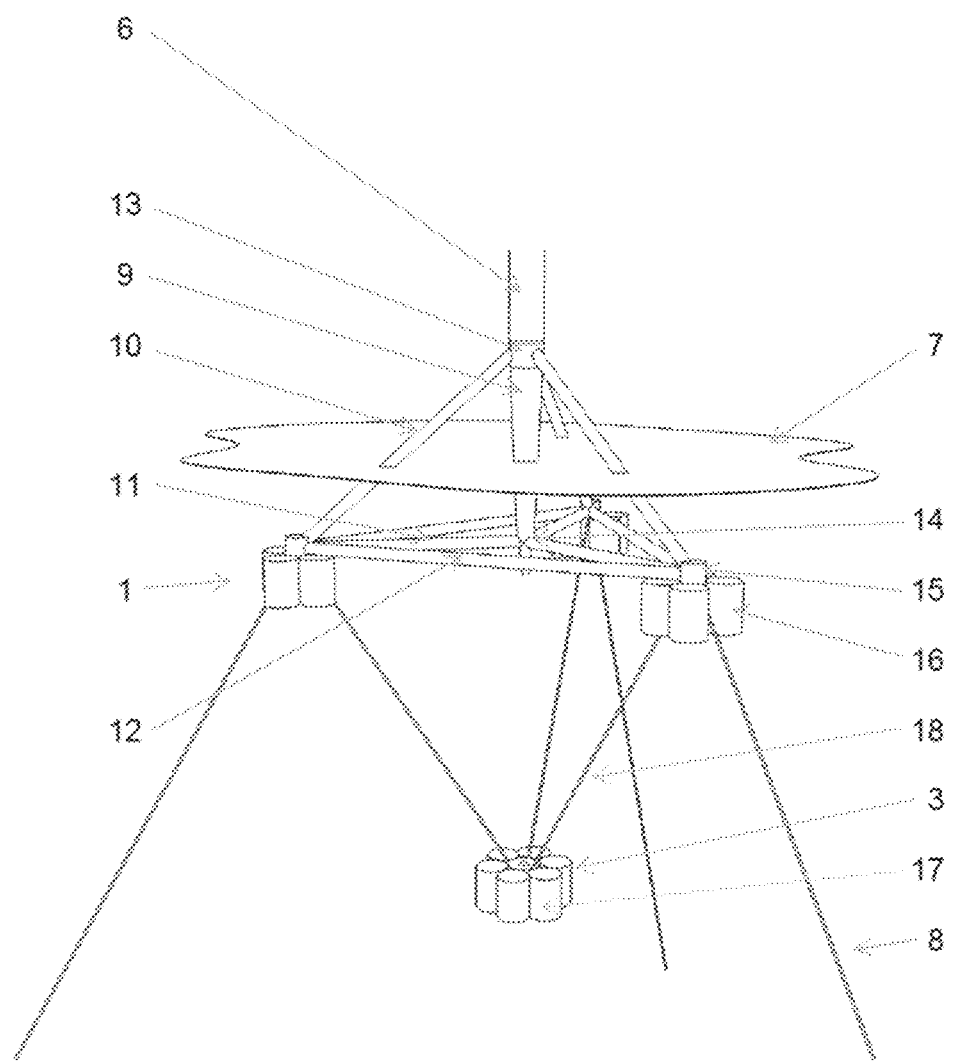
FIG. 2 illustrates the floating wind turbine foundation depicted in FIG. 1 in more detail.

FIG. 2 shows the floating foundation hull 1 and the counterweight 3 in more detail. The floating foundation hull 1 may be implemented as a tetrahedral structure comprising a central column 9, three diagonal braces 10, three radial braces 11, and three lateral braces 12. At the apex of the tetrahedron the three diagonal braces 10 are connected to the central column 9 at a transition piece 13 which also serves to connect the wind turbine tower 6 to the floating foundation hull 1. At the center of the bottom place of the tetrahedron the three radial braces 11 are connected to the central column 9 at a bottom node 14. At each corner of the bottom plane of the tetrahedron the diagonal brace 10, the radial brace 11, and the lateral brace 12 are all connected at a lateral node 15. At each lateral node 15 a set of hull buoyancy tanks 16 are arranged.

The counterweight 3 may comprise one or more counterweight buoyancy tanks 17. The counterweight 3 is suspended below the hull 1 by means of counterweight suspension chains 18.

The counterweight buoyancy tanks 17 of the counterweight 3 have dimensions such that when the internal volume is filled with air, the total buoyancy of the counterweight is close to or greater than its weight, making it capable of floating with moderate or no support from the hull 1 of the floating foundation. When the counterweight buoyancy tanks 17 are flooded with water, the weight is increased and the counterweight will sink to a level determined by the counterweight suspension chains 18. The total downwards force from the submerged weight of the counterweight 3 on the counterweight suspension chains 18 can be adjusted by adjusting the amount of water fill in the counterweight buoyancy tanks 17.

The foundation 1 is kept at its station by means of three mooring lines 8 attached to anchors installed at the seabed.

The embodiment shown in FIGS. 1 and 2 is functionally a spar buoy. The total weight of the floating wind turbine comprising the weight of the hull 1 (with any additional ballast, preferably located in the hull buoyancy tanks 16), the wind turbine 2, the (partly or completely) flooded counterweight 3 and the counterweight suspension chains 18, combined with the downwards pull of the mooring lines 8, is offsetting the total buoyancy on the system to such an extent that the hull 1 is submerged to a level which is in still water sufficiently below the waterplane 7 to ensure that no part of the hull buoyancy tanks 16 is above water even at maximum design sea state conditions.

In this embodiment the foundation according to the invention has all the advantages of a spar buoy, but without the installation limitations imposed by the large draft of traditional spars. As for any other spar buoy, stability requires that the center of gravity of the complete structure is below the buoyancy center.

Figure 3:
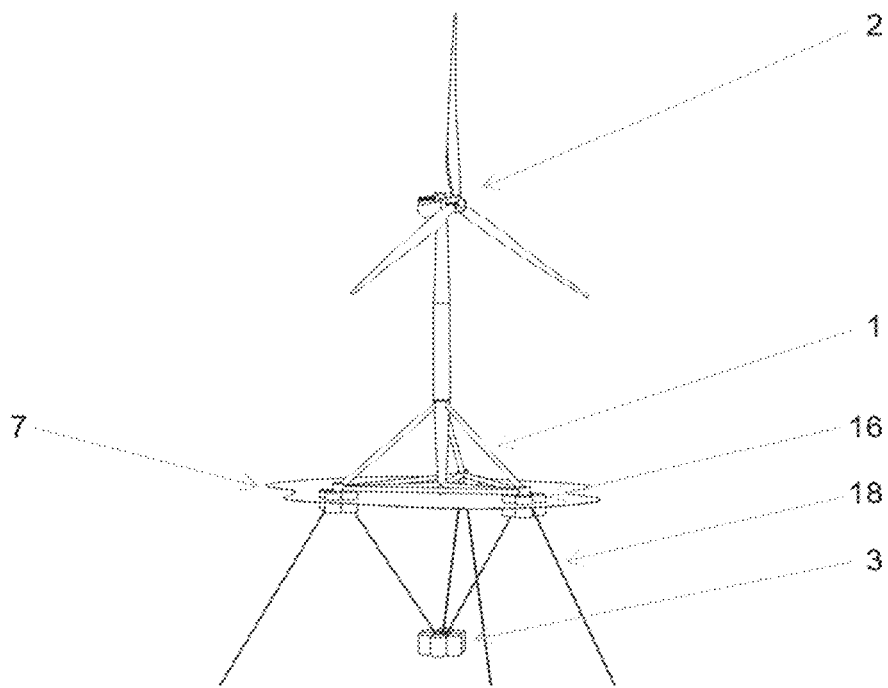
FIG. 3 illustrates a floating wind turbine foundation according to embodiments of the invention, implemented as a semisubmersible.

FIG. 3 shows another embodiment of a floating wind turbine according to the invention. The arrangements are substantially the same as in FIGS. 1 and 2, but here the foundation is functionally a semisubmersible. The total weight of the floating wind turbine comprising the weight of the hull 1 (with any additional ballast, preferably located in the hull buoyancy tanks 16), the wind turbine 2, the (partly or completely) flooded counterweight 3, and the counterweight suspension chains 18, combined with the downwards pull of the mooring lines 8, is not sufficient to offset the total buoyancy on the system to such an extent that the hull buoyancy tanks 16 are completely submerged at still water.

In this embodiment the foundation according to the invention has all the advantages of a semisubmersible, but with much reduced heeling angles during turbine operation since the overturning moment created by the large lateral forces acting on the turbine rotor is in this embodiment offset not only by differential submersion of the hull buoyancy tanks 16, as for a conventional semisubmersible, but also by the righting moment from the counterweight 3.

Furthermore, the foundation according to the embodiments of the invention has the additional advantage that the dynamic response of the foundation to excitation from fluctuating wind and wave forces can be adjusted to a larger extent than is possible for a conventional semisubmersible. The ballasting level of the counterweight buoyancy tanks 17 represents an additional degree of freedom for the foundation designer, and by adjustment of the ballast levels of the hull buoyancy tanks 16 and the counterweight buoyancy tanks 17 desired combinations of natural periods for tilt/roll and yaw can be obtained. It is even possible to fine-tune these natural periods and their relations after installation of the foundation without the need of ballasting vessels.

Figure 4:
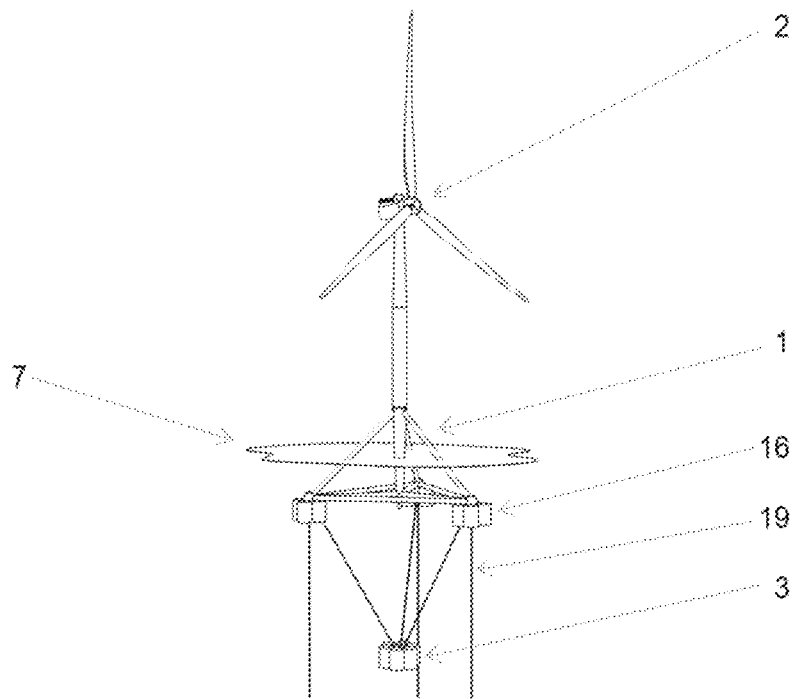
FIG. 4 illustrates a floating wind turbine foundation according to embodiments of the invention, implemented as a TLP.

FIG. 4 shows another embodiment of a floating wind turbine according to the invention. The arrangements of the hull 1, the turbine 2 and the counterweight 3 are substantially the same as in FIGS. 1 and 2, but the station keeping arrangement is different. The foundation is attached through taut tethers 19 to anchors installed at the seabed, and it is functionally a TLP (Tension Leg Platform). The total weight of the floating wind turbine comprising the weight of the hull 1, the wind turbine 2, the (partly or completely) flooded counterweight 3, and the tethers 19 is not sufficient to offset the total buoyancy on the system to such an extent that the hull buoyancy tanks 16 are completely submerged at still water, and left to its own the foundation would rise to the surface. However, due to the downwards forces in the taut tethers 19 the foundation is stationed at a depth where hull buoyancy tanks 16 are completely submerged to a level which is in still water sufficiently below the waterplane 7 to ensure that no part of the tanks is above water even at maximum design sea state conditions.

In this embodiment the foundation according to the invention has all the advantages of a TLP mentioned in the introductory part of the description. The lowering of the center of gravity relative to a conventional TLP caused by the counterweight 3 helps reduce the amplitude of the vertical forces in the tethers 19 during surge excursions.

For all embodiments, the dynamic response of the foundation to excitation from fluctuating wind and wave forces can be adjusted to a larger extent than is possible for a conventional TLP. As mentioned it is even possible to fine-tune natural periods and centers of gravity and buoyancy after installation of the foundation without the need of ballasting vessels.

Figure 5:
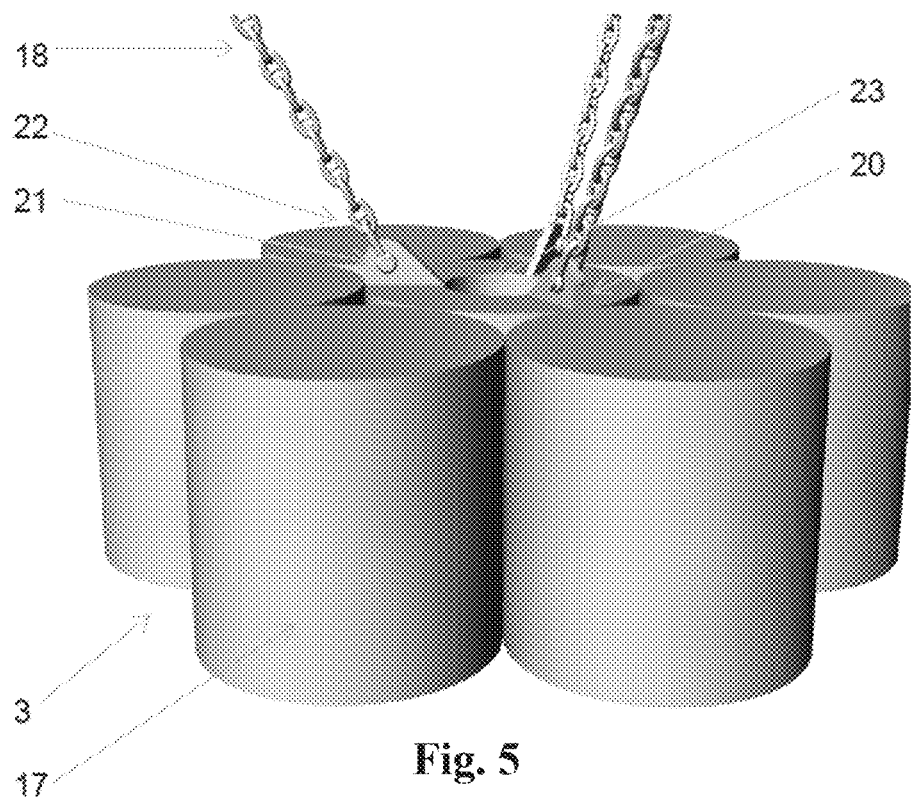
FIG. 5 illustrates the attachment arrangements of the counterweight at the counterweight itself.

FIG. 5 shows a preferred embodiment of the counterweight. The counterweight 3 comprises a set of counterweight buoyancy tanks 17 surrounding a central tank 20 fitted with attachment lugs 21. A set of shackles 22 connect the attachment lugs 21 with the counterweight suspension chains 18.

The central counterweight tank 20 has a central, cylindrical hole 23 which serves as a locking arrangement, connecting the counterweight 3 to the hull 1 during installation and maintenance.

Figure 6:
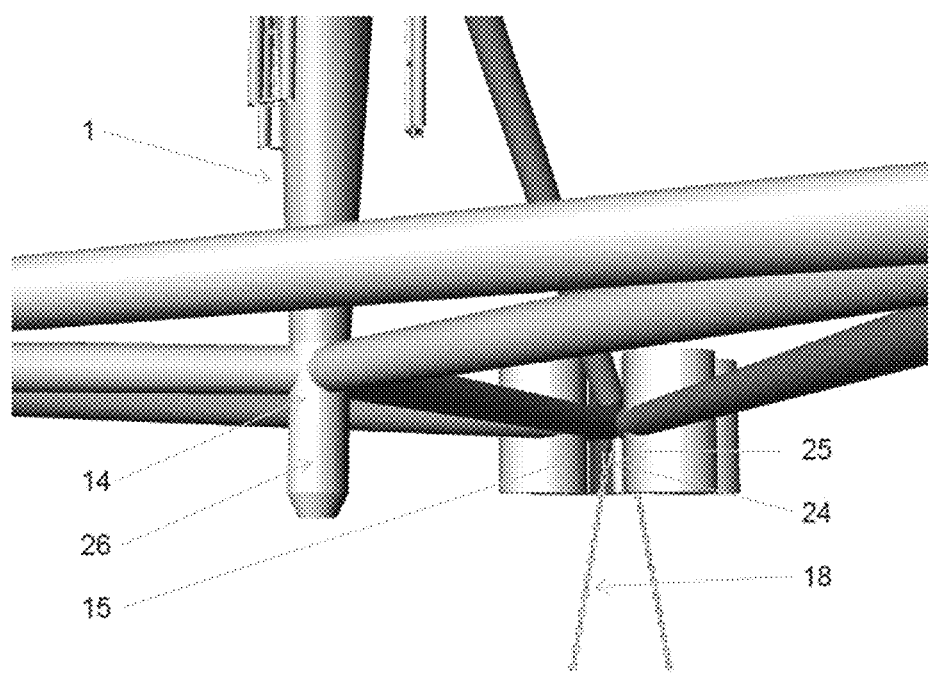
FIG. 6 illustrates the attachment arrangements of the counterweight at the hull.

FIG. 6 shows a preferred embodiment of the counterweight suspension at the hull 1. The counterweight suspension chain 18 is attached to the lateral node 15 with a shackle 24 engaging with an attachment lug 25.

In the foreground is seen the bottom node 14 fitted with a connecting pin 26. The pin fits into the central, cylindrical hole 23 of the counterweight 3 and which serves as a locking arrangement, connecting the counterweight 3 to the hull 1 during installation and maintenance.

FIG. 7 shows different embodiments of the counterweight suspension.

Figure 7A:
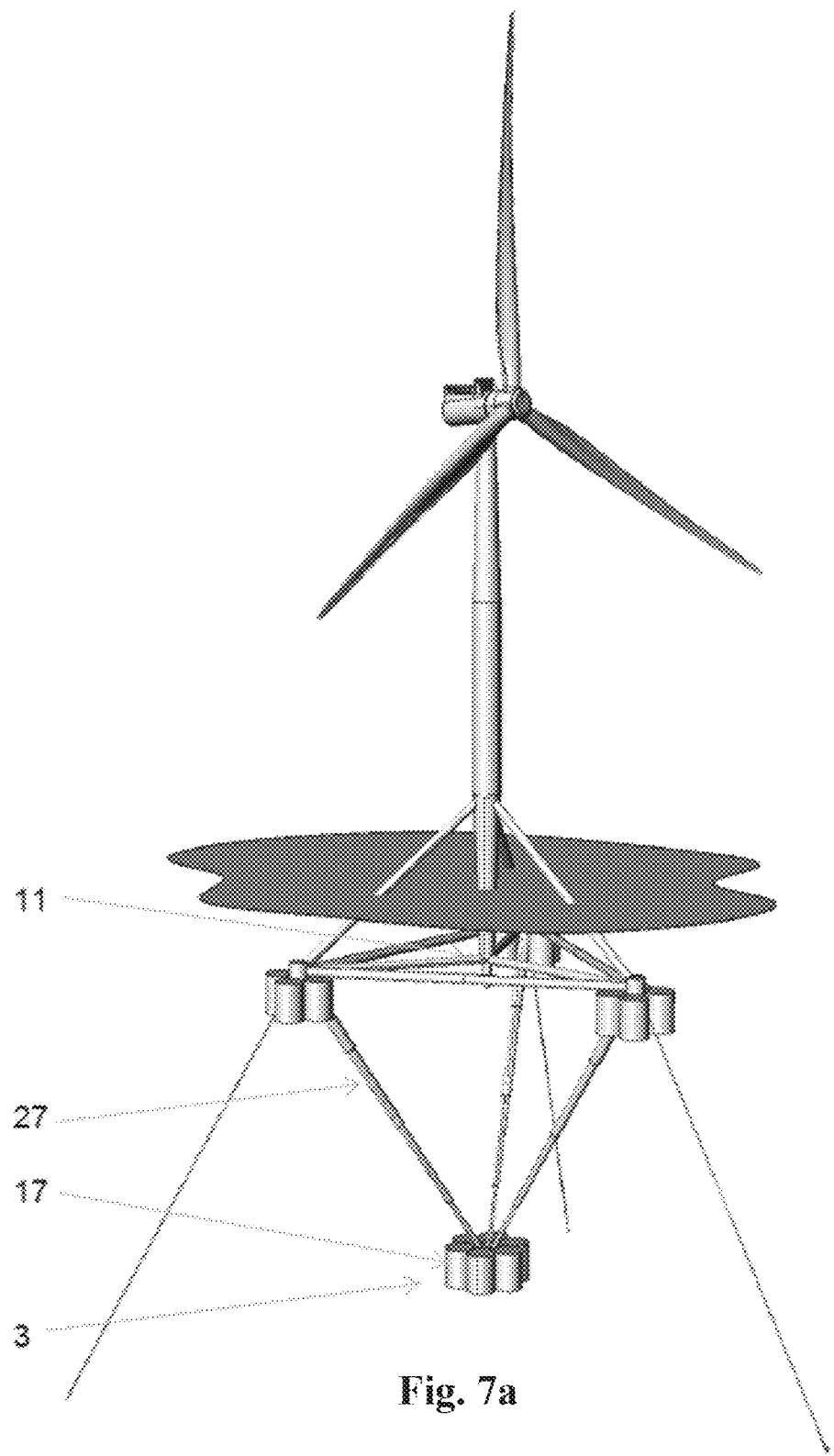
FIG. 7a illustrates a first embodiment of the counterweight suspension.

FIG. 7a shows an embodiment where the counterweight suspension chains 18 are replaced with telescopic tubes 27. When the counterweight buoyancy tanks 17 are air-filled and the counterweight 3 is located adjacent to the bottom node 11, e.g. during towing, the telescopic tubes 27 are partially collapsed, and when the counterweight buoyancy tanks 17 are partly or completely water-filled the telescopic tubes 27 extend to their end limit, defining the depth of the counterweight 3.

This arrangement has the benefit that the telescopic tubes 27 will not sag during e.g. towing as may be the case for the counterweight suspension chains 18 of the first embodiment.

Figure 7B:
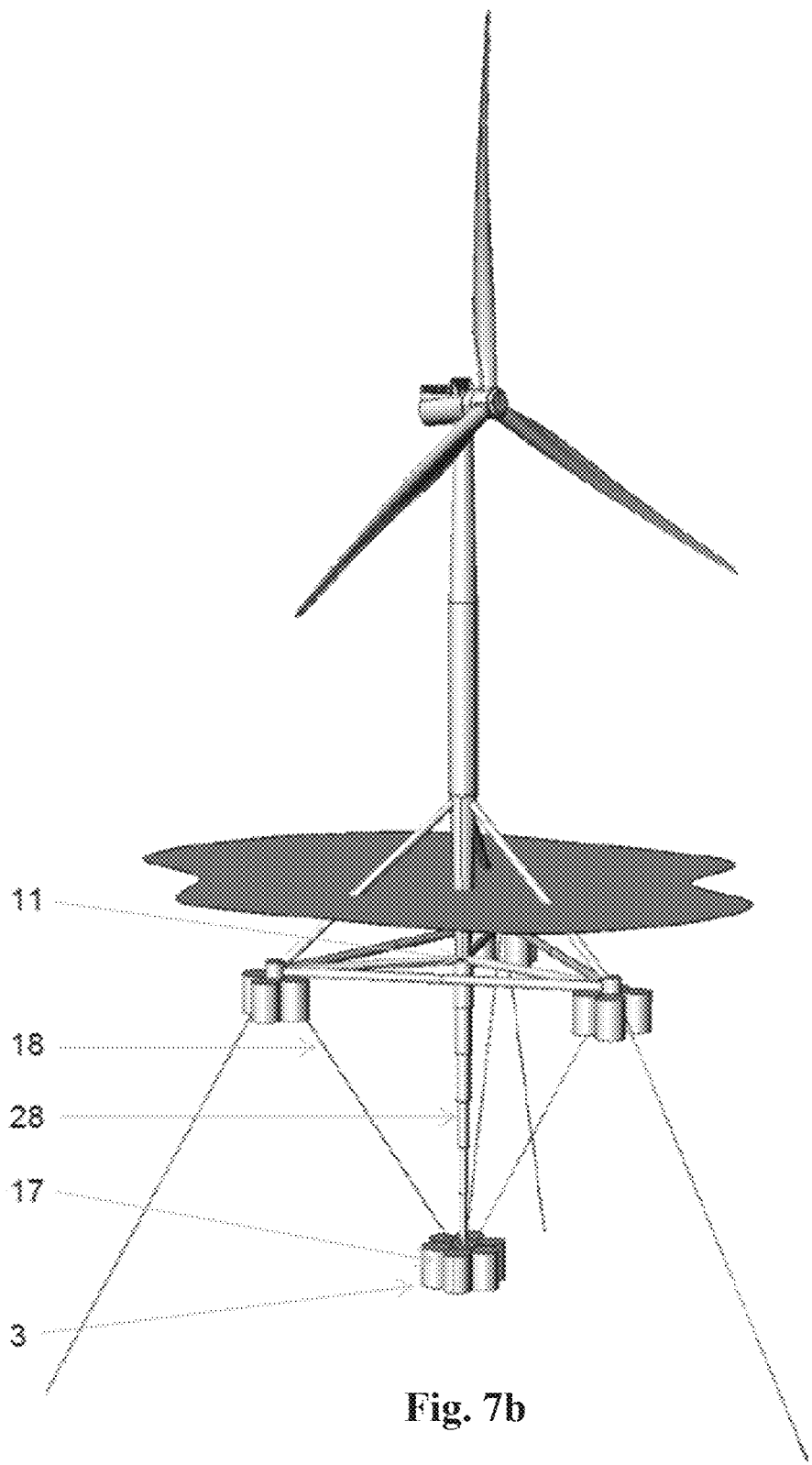
FIG. 7b illustrates another embodiment of the counterweight suspension.

FIG. 7b shows an embodiment where the counterweight suspension chains 18 are replaced or supplemented with a telescopic center-tube 28. When the counterweight buoyancy tanks 17 are air-filled and the counterweight 3 is located adjacent to the bottom node 11, e.g. during towing, the telescopic center-tube may be collapsed into the bottom of the center column 6 and/or into the central hole 23 in the central tank 20 of the counterweight 3. When the counterweight buoyancy tanks 17 are partly or completely water-filled the telescopic center-tube extends to its end limit, defining the depth of the counterweight 3. A contribution to support of lateral forces and transfer of the resulting moments may be provided by counterweight support wires or chains 18.

This arrangement has the benefit that the telescopic center-tube 28 provides a precise guidance of the counterweight 3 during installation and maintenance processes.

Figure 7C:
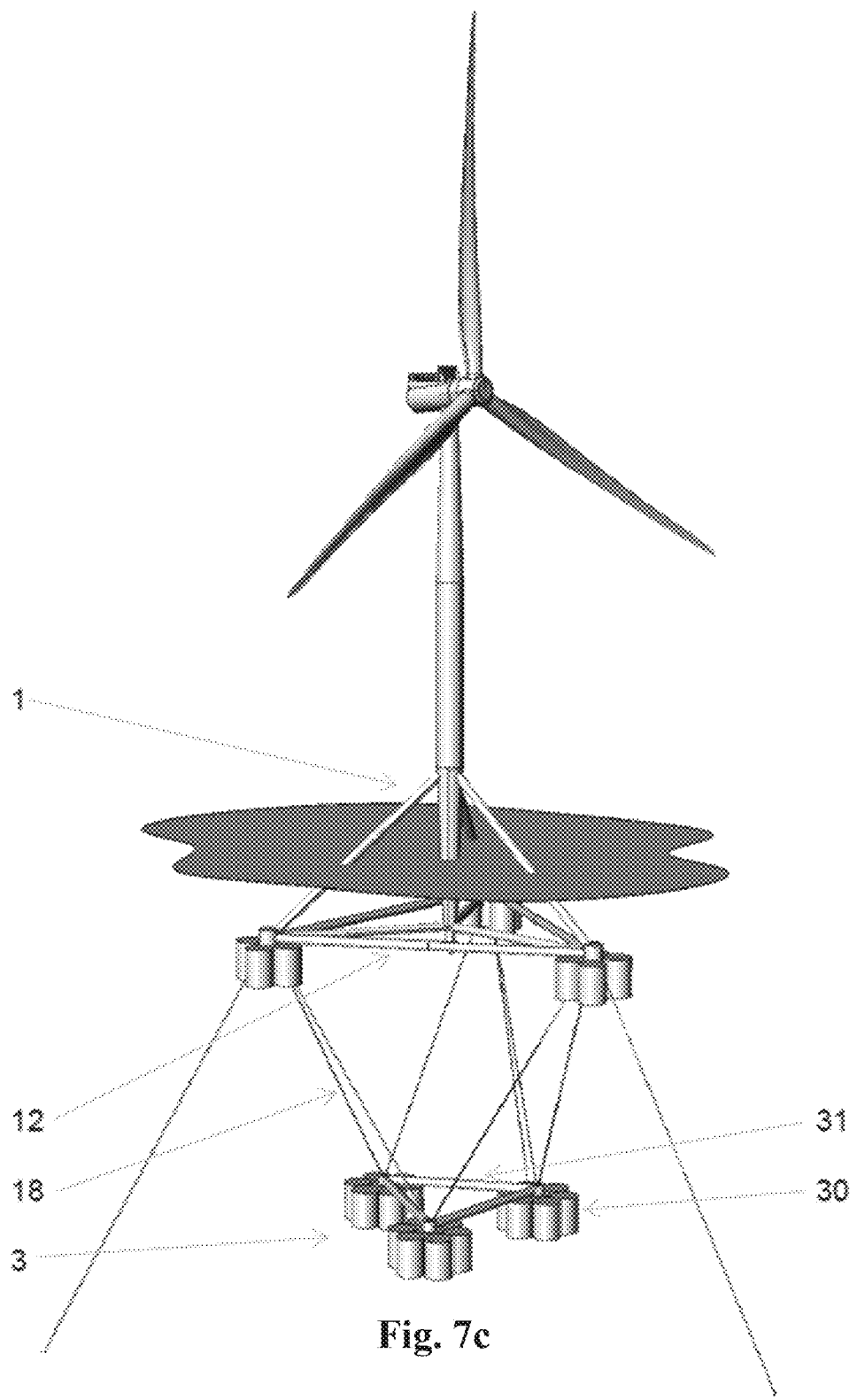
FIG. 7c illustrates yet another embodiment of the counterweight suspension.

FIG. 7c shows an embodiment where the counterweight 3 is shaped as a polygon, comprising a number of buoyancy tank sets 30 kept in mutual position with a set of braces 31. When the buoyancy tank sets 30 are air-filled, e.g. during towing, the counterweight 3 is located close to the lateral braces 12 of the hull 1. When the buoyancy tank sets 30 are partly or completely water-filled the counterweight is supported by counterweight suspension chains 18, defining the depth of the counterweight 3.

This arrangement has the benefit that due to the distribution of the ballast over a potentially larger number of buoyancy tank sets 30 the total weight of the counterweight 3 may be higher than is easily arranged with the single tank set 15 of the first embodiment, which in turn may provide a lower center of gravity and a higher degree of stability.

It will be obvious to the person skilled in the art that the different embodiments may be combined to provide further, advantageous solutions.

FIGS. 8a-d show an installation sequence according to an embodiment of the invention, where the foundation is implemented as a spar buoy.

Figure 8:
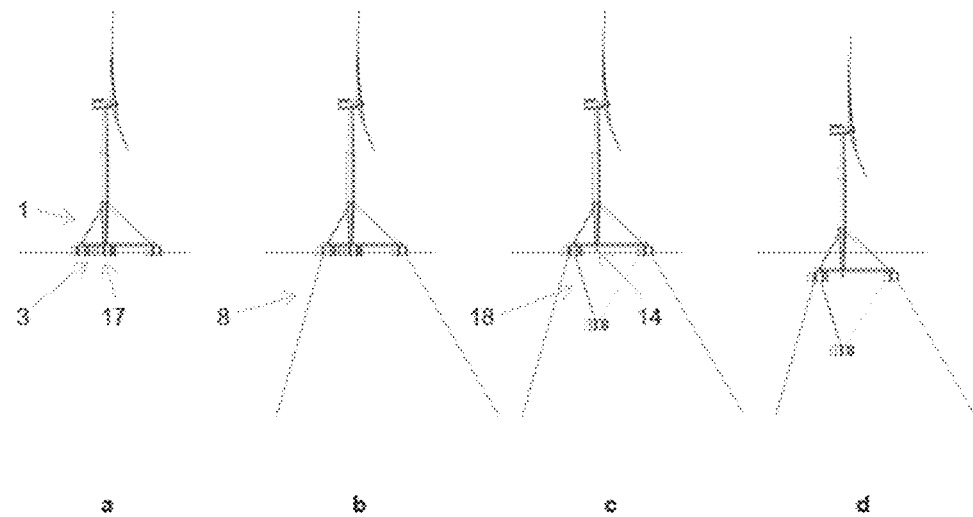
FIG. 8a illustrates an installation sequence according to embodiments of the invention, where the foundation is implemented as a spar buoy.
FIG. 8b illustrates another installation sequence step according to embodiments of the invention, where the foundation is implemented as a spar buoy.
FIG. 8c illustrates another installation sequence step according to embodiments of the invention, where the foundation is implemented as a spar buoy.
FIG. 8d illustrates another installation sequence step according to embodiments of the invention, where the foundation is implemented as a spar buoy.

FIG. 8a shows the foundation at the quayside, prior to towing. The foundation is maintained in this configuration also during towing. The counterweight buoyancy tanks 17 are air-filled, and therefore the counterweight 3 has sufficient buoyancy to float. It is kept in a convenient position adjacent to the bottom node 14 by means of a suitable connecting arrangement, such as the pin-in-hole arrangement explained above for FIGS. 4 and 6. The counterweight suspension chains 18 are attached to the floating foundation hull 1 by suitable means in order not to affect the draft of the complete structure during towing.

FIG. 8b shows the foundation at the desired offshore location. The foundation is still in the towing configuration, but now the mooring lines 8 have been connected. The counterweight suspension chains 18 have been released from the floating foundation hull 1.

FIG. 8c shows the foundation at the desired offshore location after commencement of the flooding of the counterweight buoyancy tanks 17. At the stage shown on the figure the counterweight buoyancy tanks 17 have been water-filled to such a level that the buoyancy of the counterweight 3 is no longer sufficient to carry its weight. Consequently, the counterweight 3 has sunk to its final position under the hull 1, and the counterweight suspension chains 18 have been extended to approximately their final length. However, the submerged weight (the difference between the weight and the buoyancy) of the counterweight 3 is not yet sufficient to alter the waterplane level on the hull 1.

FIG. 8d shows the foundation at the desired offshore location in its final position. The flooding of the counterweight buoyancy tanks 17 has been completed to the desired level, and the submerged weight of the counterweight 3, possibly supplemented with the weight of ballast in the hull buoyancy tanks 16 of the hull 1, is sufficient to pull the hull 1 to a desired level below the waterplane. The final draft may be adjusted by a combination of ballast water level in the counterweight buoyancy tanks 17 and the hull buoyancy tanks 16 of the hull 1.

FIGS. 9a-d show an installation sequence according to an embodiment of the invention, where the foundation is implemented as a semisubmersible.

Figure 9:
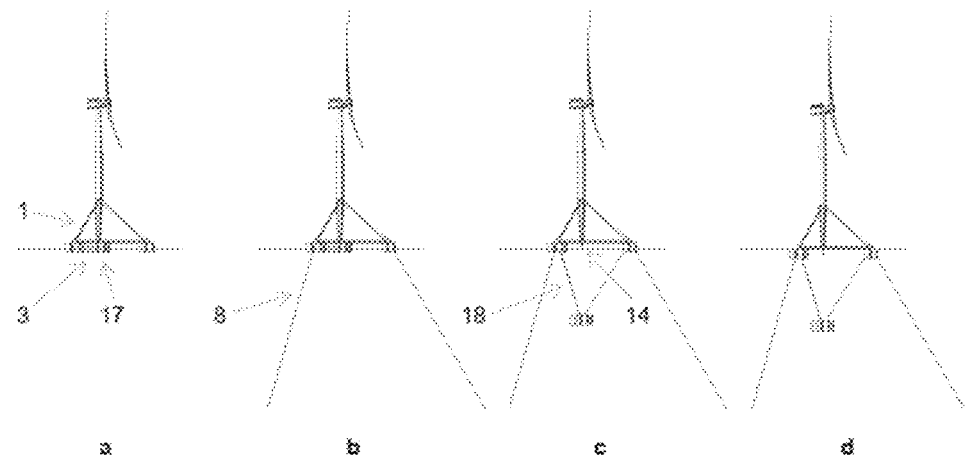
FIG. 9a illustrates an installation sequence according to embodiments of the invention, where the foundation is implemented as a semisubmersible.
FIG. 9b illustrates an installation sequence according to embodiments of the invention, where the foundation is implemented as a semisubmersible.
FIG. 9c illustrates another installation sequence step according to embodiments of the invention, where the foundation is implemented as a semisubmersible.
FIG. 9d illustrates another installation sequence step according to embodiments of the invention, where the foundation is implemented as a semisubmersible.

FIG. 9a shows the foundation at the quayside, prior to towing. The foundation is maintained in this configuration also during towing. The counterweight buoyancy tanks 17 are air-filled, and the counterweight has sufficient buoyancy to float. It is kept in a convenient position adjacent to the bottom node 14 by means of a suitable connecting arrangement, such as the pin-in-hole arrangement explained above for FIGS. 4 and 6. The counterweight suspension chains 18 are attached to the floating foundation hull 1 by suitable means in order not to affect the draft of the complete structure during towing.

FIG. 9b shows the foundation at the desired offshore location. The foundation is still in the towing configuration, but now the mooring lines 8 have been connected. The counterweight suspension chains 18 have been released from the floating foundation hull 1.

FIG. 9c shows the foundation at the desired offshore location after commencement of the flooding of the counterweight buoyancy tanks 17. At the stage shown on the figure the counterweight buoyancy tanks 17 have been water-filled to such a level that the buoyancy of the counterweight 3 is no longer sufficient to carry its weight. Consequently, the counterweight 3 has sunk to its final position under the hull 1, and the counterweight suspension chains 18 have been extended to approximately their final length. However, the submerged weight (the difference between the weight and the buoyancy) of the counterweight 3 is not yet sufficient to alter the waterplane level on the hull 1.

FIG. 9d shows the foundation at the desired offshore location in its final position. The flooding of the counterweight buoyancy tanks 17 has been completed to the desired level, and the submerged weight of the counterweight 3, possibly supplemented with the weight of ballast in the hull buoyancy tanks 16 of the hull 1, is sufficient to pull the hull 1 to a desired level, which is a compromise between having sufficient residual waterplane area and above-waterplane height of the hull buoyancy tanks 16 of the hull 1 to ensure primary stability, while at the same time achieving the desired additional stability from the counterweight 3.

FIGS. 10a-d show an installation sequence according to an embodiment of the invention, where the foundation is implemented as a TLP.

Figure 10:
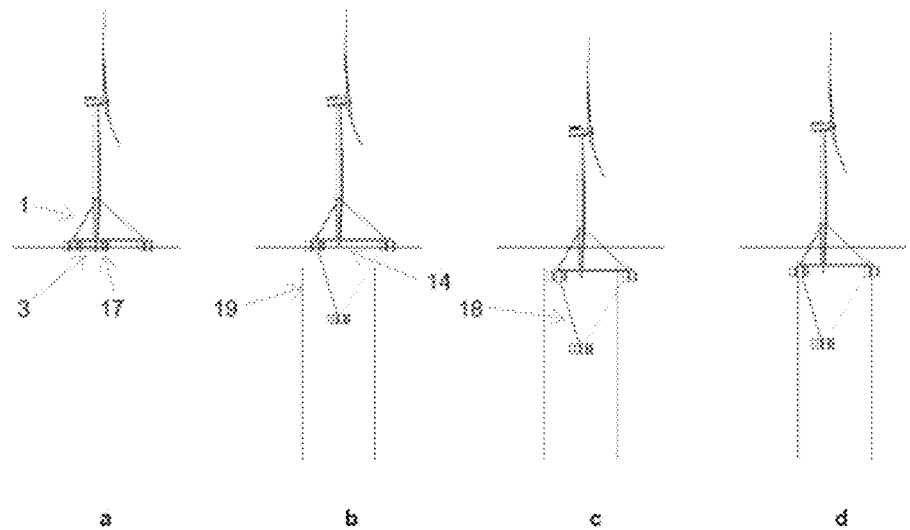
FIG. 10a illustrates an installation sequence according to embodiments of the invention, where the foundation is implemented as a TLP.
FIG. 10b illustrates another installation sequence step according to embodiments of the invention, where the foundation is implemented as a TLP.
FIG. 10c illustrates another installation sequence step according to embodiments of the invention, where the foundation is implemented as a TLP.
FIG. 10d illustrates another installation sequence step according to embodiments of the invention, where the foundation is implemented as a TLP.

FIG. 10a shows the foundation at the quayside, prior to towing. The foundation is maintained in this configuration also during towing. The counterweight buoyancy tanks 17 are air-filled, and the counterweight has sufficient buoyancy to float. It is kept in a convenient position adjacent to the bottom node 14 by means of a suitable connecting arrangement, such as the pin-in-hole arrangement explained above for FIGS. 4 and 6. The counterweight suspension chains 18 are attached to the floating foundation hull 1 by suitable means in order not to affect the draft of the complete structure during towing.

FIG. 10b shows the foundation at the desired offshore location after commencement of the flooding of the counterweight buoyancy tanks 17. At the stage shown on the figure the counterweight buoyancy tanks 17 have been water-filled to such a level that the buoyancy of the counterweight 3 is no longer sufficient to carry its weight. Consequently, the counterweight 3 has sunk to its final position under the hull 1, and the counterweight suspension chains 18 have been extended to approximately their final length. However, the submerged weight (the difference between the weight and the buoyancy) of the counterweight 3 is not yet sufficient to alter the waterplane level on the hull 1. Below the foundations the pre-installed tethers 19 are fitted with flex-joints and are ready for hook-up FIG. 10c shows the foundation at the desired offshore location after the flooding of the counterweight buoyancy tanks 17 has been completed to the desired level. Here, the submerged weight of the counterweight 3, possibly supplemented with the weight of ballast in the hull buoyancy tanks 16 of the hull 1, is sufficient to pull the hull 1 to a desired level, which is slightly below the desired final draft. During the submersion process the foundation is temporarily acting as a spar buoy. The hull 1 has been lowered to a position where the mating surfaces for the tether flex-joints are slightly below and to the side of the flex-joints.

FIG. 10d shows the foundation at the desired offshore location in its final position. The hull 1 has been moved sideways so the mating surfaces for the tether flex-joints have been located directly below the flex-joints. Subsequently, the submerged weight of the hull 1 and the counterweight 3 has been reduced by removal of water ballast from the counterweight buoyancy tanks 17 and/or from the hull buoyancy tanks 16 of the hull 1 to such a degree that the mating surfaces for the tether flex-joints have been joined with the flex-joints, and the desired pre-tension of the tethers 19 has been achieved.

FIGS. 11a-d show an inspection and maintenance sequence according to an embodiment of the invention, using a spar buoy configuration as example.

Figure 11:
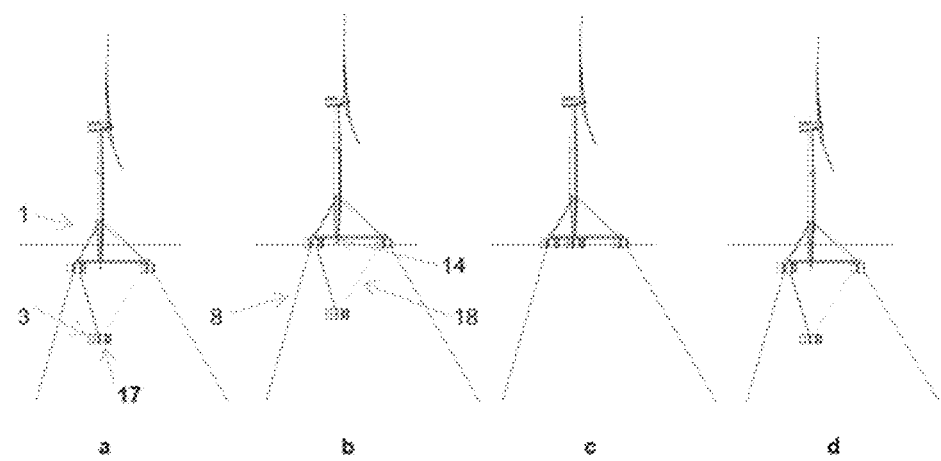
FIG. 11a illustrates an inspection and maintenance sequence according to embodiments of the invention.
FIG. 11b illustrates another inspection and maintenance sequence step according to embodiments of the invention.
FIG. 11c illustrates another inspection and maintenance sequence step according to embodiments of the invention.
FIG. 11d illustrates another inspection and maintenance sequence step according to embodiments of the invention.

FIG. 11a shows the foundation prior to commencement of the maintenance process. The submerged weight (the difference between the weight and the buoyancy) of the counterweight 3, possibly supplemented with the weight of ballast in the hull buoyancy tanks 16 of the hull 1, maintains the position of the hull 1 at a desired level below the waterplane.

FIG. 11b shows the foundation after the commencement of the maintenance process. The counterweight buoyancy tanks 17 have been partly evacuated and are now water-filled to such a level that the buoyancy of the counterweight 3 is almost sufficient to carry its weight. The counterweight 3 is still at its final position under the hull 1, but the submerged weight of the counterweight 3 is no longer sufficient to maintain the hull 1 in a submerged position. Consequently, the hull has risen to the surface, making the hull surface, bolt connections and joints with the counterweight suspension chains 18 and the mooring lines 8 available for cleaning, inspection and maintenance.

FIG. 11c shows the foundation in a form suitable for general overhaul. The counterweight buoyancy tanks 17 have been evacuated to such a level that the buoyancy of the counterweight 3 is sufficient to carry its weight. Consequently, the counterweight 3 has risen to its towing position adjacent to the bottom node 14, making the counterweight surface, bolt connections and joints with the counterweight suspension chains 18 available for cleaning, inspection and maintenance. As depicted in FIG. 11c, the counterweight suspension chains 18 can just be left in their natural, slack position during offshore maintenance. However, they may also be lifted and connected to a number of attachment points at the hull 1, making towing possible without excessive draft rom the chains. In this configuration the complete floating foundation may be disconnected from the mooring chains 8 and towed back to harbor for major maintenance or ultimately decommissioning.

Figure 12:
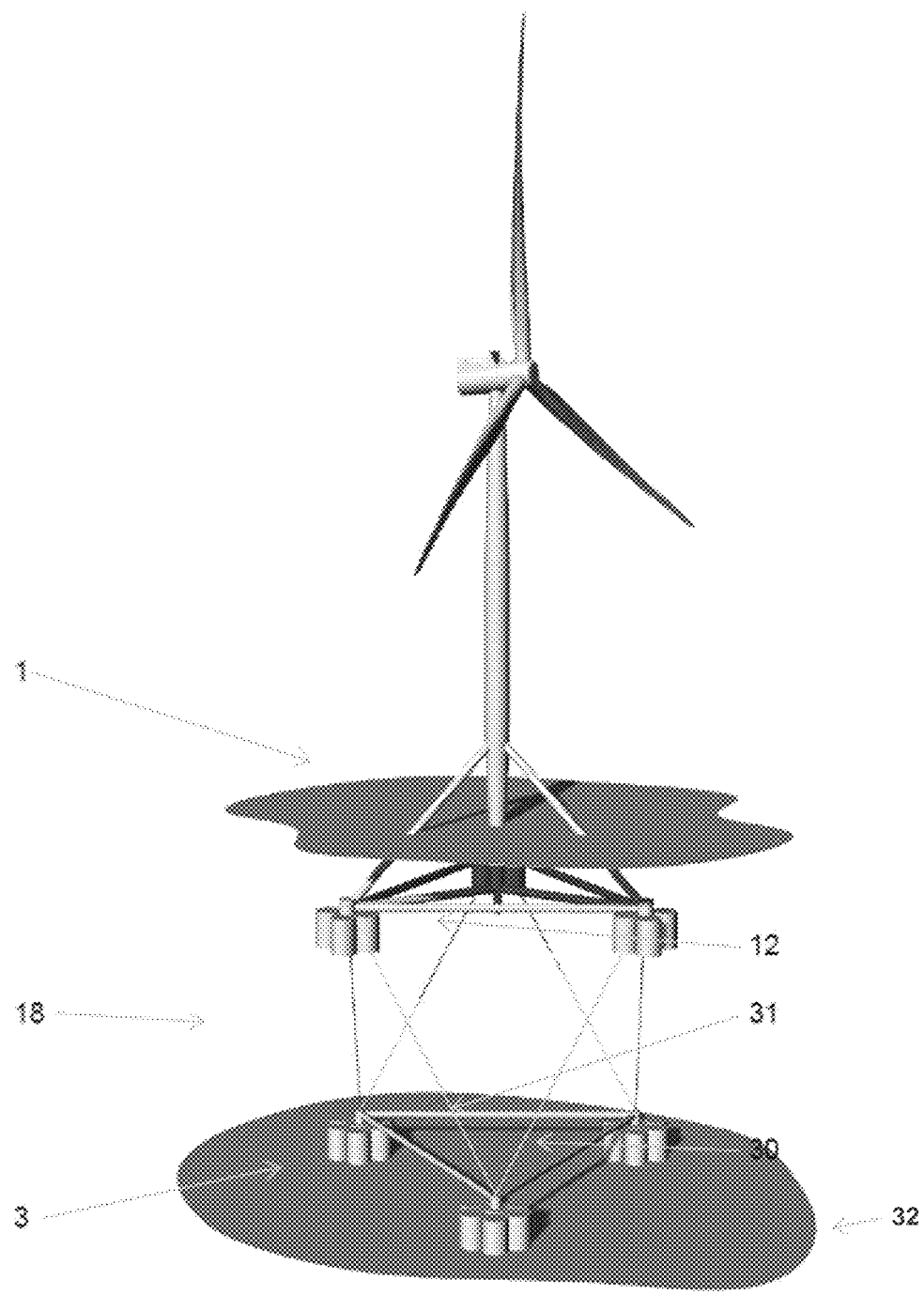
FIG. 12 illustrates an installation sequence where the counterweight arrangement serves as TLP anchors.

FIG. 12 shows an embodiment of the foundation according to the invention, where the foundation is implemented as a TLP, and where the counterweight serves as TLP anchor.

In this arrangement the counterweight 3 is shaped as a polygon, as further described in relation to FIG. 7.c. The counterweight comprising a number of buoyancy tank sets 30 kept in mutual position with a set of braces 31. When the buoyancy tank sets 30 are air-filled, e.g. during towing, the counterweight 3 is located close to the lateral braces 12 of the hull 1. When the buoyancy tank sets 30 are partly or completely water-filled the counterweight is supported by counterweight suspension means 18, defining the depth of the counterweight 3. In this particular embodiment the desired depth of the counterweight 3 is at a position under the hull 1 which corresponds to the difference between the water depth at the installation site and the desired depth of the hull 1 after completion of installation. Following lowering of the counterweight to its desired position, it is further ballasted and pulls the hull below the surface to the desired depth, at which stage the counterweight rests on the seabed 32. Here the counterweight replaces pre-installed TLP anchors, and the counterweight suspension means replace pre-installed TLP tethers.

In order to ensure high transversal load carrying capacity the lower rim of the tanks 30 may be designed as a skirt that buries itself into the seabed 32 during installation. Furthermore, the tanks may be fitted with means to apply suction on the inside of such skirt in order to further enhance the load carrying capacity in both vertical and transversal directions.

This arrangement has several benefits.

Firstly, it shares with the embodiment outlined in FIG. 7.c the benefit that due to the distribution of the ballast over a potentially larger number of buoyancy tank sets 30 the total weight of the counterweight 3 may be higher than is easily arranged with the single tank set 15 of the first embodiment, which in turn may provide a lower center of gravity and a higher degree of stability.

Secondly, this embodiment facilitates a truly single-sequence installation. There is no need for pre-installed anchors, anchor lines, tethers, etc., since the combination of the hull 1, the counterweight 3, and the suspension means 18 together form the complete unit comprising floater, anchor and tethers or anchor lines. Consequently, the complete installation can be done as one single operation. This will greatly reduce installation costs.

Thirdly, decommissioning is equally simple. By re-inflating with air the tanks 30 of the counterweight 3 the complete foundation, including anchors and anchor lines, can be floated off the installation site in one single operation. This will greatly reduce decommissioning costs.

Finally, the effect of the arrangement of the suspension means 18 that is required to ensure stability during submersion of the hull 1 implicitly provides superior stability once the counterweight 3 has come to rest on the seabed. Functionally the foundation is a TLP, but unlike normal TLPs the triangular arrangement of the suspension means prevents lateral movements of the hull 1 in response to hydrodynamic forces. As a consequence, the risk of tether slack is significantly reduced, and since the direction of the tethers 18 relative to the hull 1 and the counterweight 3 is largely constant the need for costly flex joints at the tether ends is eliminated.

In a variant of this embodiment the counterweight is not shaped as a polygon comprising three or more tank sets 30 kept in position by braces 31, but is shaped as a single tank set as in FIGS. 1 and 2. When sunk to a position where the counterweight 3 rests on the seabed the foundation becomes a special variant of a TLP where stability is a function of inclination. Here the need for a flexjoint is not eliminated at the connection of the counterweight 3 to the suspension means 18, and the hull 1 will have some lateral and tilting movements as a consequence of aerodynamic forces acting on the wind turbine 2 and/or hydrodynamic forces acting on the hull 1, but the benefit of this variant of the embodiment is that the counterweight 3 remains very simple.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A floating wind turbine comprising a hull, a wind turbine mounted on top of the hull and a counterweight suspended below the hull by a counterweight suspension means, wherein
   the counterweight comprises one or more counterweight buoyancy tanks;
   the one or more counterweight buoyancy tanks have dimensions such that when the internal volume is filled with air or another gas, the total buoyancy of the counterweight is substantially equal to or greater than its weight, making it capable of floating in a towing/maintenance position with substantially no additional support in the vertical direction;
   when the one or more counterweight buoyancy tanks are partly or completely flooded with water, the counterweight will sink to an installed position at a level determined by the counterweight suspension means;
   the counterweight suspension means is separately or jointly capable of transferring both forces and moments to the hull, thereby enabling the counterweight to stabilize the hull when the counterweight is in its installed position;
   wherein the counterweight is shaped as a polygon comprising a set of the one or more counterweight buoyancy tanks located at each corner of the polygon, and wherein each corner is connected to at least two separate attachment points on the hull by respective counterweight suspension means.

2. The floating wind turbine according to claim 1, wherein after installation the hull is functionally a spar buoy.

3. The floating wind turbine according to claim 1, wherein after installation the hull is functionally a semisubmersible.

4. The floating wind turbine according to claim 1, wherein after installation the hull is functionally a tension leg platform.

5. The floating wind turbine according to claim 1, wherein the counterweight suspension means comprises telescopic tubes.

6. The floating wind turbine according to claim 1, wherein the counterweight suspension means is supplemented with or replaced by a telescopic center tube.

7. The floating wind turbine according to claim 1, wherein an attachment of the counterweight suspension means to the polygonal counterweight is separated from the center of gravity of the polygonal counterweight by a distance which is equal to or larger than half of the distance from the center of gravity of the hull to an attachment of the counterweight suspension means to the hull.

8. The floating wind turbine according to claim 1, wherein the counterweight is attached to the hull during towing.

9. The floating wind turbine according to claim 1, wherein a static and dynamic response of the floating foundation can be adjusted before installation through a combination of adjustment of i) ballasting of the counterweight buoyancy tanks, ii) ballasting of the hull, and/or iii) adjustment of the installed depth of the counterweight.

10. The floating wind turbine according to claim 1, wherein a static and dynamic response of the floating foundation can be adjusted after installation through a combination of adjustment of i) ballasting of the counterweight buoyancy tanks, and ii) ballasting of the hull.

11. The floating wind turbine according to claim 1, wherein after installation the counterweight rests on the seabed.

12. The floating wind turbine according to claim 1, wherein the hull has a hull bottom arrangement comprising lateral braces connecting lateral nodes comprising hull buoyancy tanks; and wherein each lateral node is connected via respective counterweight suspension means to at least two separate attachment points on the counterweight.

13. The floating wind turbine according to claim 12, wherein the counterweight is shaped as a triangle with a respective set of the one or more counterweight buoyancy tanks in each counterweight corner, and the hull bottom arrangement is formed as a hull triangle with the hull buoyancy tanks at each hull lateral node, wherein each counterweight corner is connected via respective counterweight suspension means with at least two lateral nodes in the hull bottom arrangement; and wherein each lateral node is connected via respective counterweight suspension means with at least two counterweight corners.

14. The floating wind turbine according to claim 13, wherein the hull bottom arrangement is the triangle opposite the apex of a tetrahedron, and wherein a wind turbine tower is connected to the apex; wherein the projection of the triangle opposite the apex is rotated relative to the projection of the triangle of the counterweight.

15. The floating wind turbine according to claim 1, wherein respective sets of the one or more counterweight buoyancy tanks are connected by braces to form the polygon.

16. The floating wind turbine according to claim 1, wherein the respective counterweight suspension means connecting each corner to the at least two separate attachment points on the hull extend from the respective corner to a lateral node on the hull and do not cross a center line of the polygon.

17. A method for the installation of a floating wind turbine comprising:
providing a hull, a wind turbine mounted on top of the hull and a counterweight suspended below the hull by a counterweight suspension means, wherein the counterweight comprises one or more counterweight buoyancy tanks; the one or more counterweight buoyancy tanks have dimensions such that when the internal volume is filled with air or another gas, the total buoyancy of the counterweight is substantially equal to or greater than its weight, making it capable of floating in a towing/maintenance position with substantially no additional support in the vertical direction; when the one or more counterweight buoyancy tanks are partly or completely flooded with water, the counterweight will sink to an installed position at a level determined by the counterweight suspension means; the counterweight suspension means is separately or jointly capable of transferring both forces and moments to the hull, thereby enabling the counterweight to stabilize the hull when the counterweight is in its installed position; the counterweight is shaped as a polygon comprising a set of the one or more counterweight buoyancy tanks located at each corner of the polygon wherein each corner is connected to at least two separate attachment points on the hull by respective suspension means;
filling the one or more counterweight buoyancy tanks of the counterweight partly or completely with air or another gas;
attaching the counterweight to the hull prior to towing;
towing the counterweight with the hull to a desired offshore position;
flooding the one or more counterweight buoyancy tanks partly or completely with water when a desired offshore position has been reached,
permitting the counterweight to sink to an installed position at a level determined by the counterweight suspension means; and
transferring forces and moments to the hull by the counterweight suspension means which are separately or jointly capable of transferring both forces and moments to the hull, thereby enabling the counterweight to stabilize the hull when the counterweight is in its installed position.

18. A method for the installation of a floating wind turbine comprising:
providing a hull, a wind turbine mounted on top of the hull and a counterweight suspended below the hull by a counterweight suspension means, wherein the counterweight comprises one or more counterweight buoyancy tanks; the one or more counterweight buoyancy tanks have dimensions such that when the internal volume is filled with air or another gas, the total buoyancy of the counterweight is substantially equal to or greater than its weight, making it capable of floating in a towing/maintenance position with substantially no additional support in the vertical direction; when the one or more counterweight buoyancy tanks are partly or completely flooded with water, the counterweight will sink to an installed position at a level determined by the counterweight suspension means; the counterweight suspension means is separately or jointly capable of transferring both forces and moments to the hull, thereby enabling the counterweight to stabilize the hull when the counterweight is in its installed position; the counterweight is shaped as a polygon comprising a set of the one or more counterweight buoyancy tanks located at each corner of the polygon wherein each corner is connected to at least two separate attachment points on the hull by respective suspension means;

filling the one or more counterweight buoyancy tanks of the counterweight partly or completely with air or another gas before launch and towing;

towing the hull and the counterweight to a desired offshore position;

attaching the counterweight to the hull when a desired offshore position has been reached;

flooding the one or more counterweight buoyancy tanks partly or completely with water, permitting the counterweight to sink to an installed position at a level determined by the counterweight suspension means; and transferring forces and moments to the hull by the counterweight suspension means which are separately or jointly capable of transferring both forces and moments to the hull, thereby enabling the counterweight to stabilize the hull when the counterweight is in its installed position.

19. A method for the maintenance of a floating wind turbine comprising:

providing a hull, a wind turbine mounted on top of the hull and a counterweight suspended below the hull by counterweight suspension means, wherein the counterweight comprises one or more counterweight buoyancy tanks; the one or more counterweight buoyancy tanks have dimensions such that when the internal volume is filled with air or another gas, the total buoyancy of the counterweight is substantially equal to or greater than its weight, making it capable of floating in a towing/maintenance position with substantially no additional support in the vertical direction;

when the one or more counterweight buoyancy tanks are partly or completely flooded with water, the counterweight will sink to an installed position at a level determined by the counterweight suspension means; the counterweight suspension means is separately or jointly capable of transferring both forces and moments to the hull, thereby enabling the counterweight to stabilize the hull when the counterweight is in its installed position; the counterweight is shaped as a polygon comprising a set of the one or more counterweight buoyancy tanks located at each corner of the polygon wherein each corner is connected to at least two separate attachment points on the hull by respective counterweight suspension means;

raising the hull from an installed position to a maintenance position by partly or completely filling the one or more buoyancy tanks of the counterweight with air or another gas;

carrying out maintenance; and flooding the one or more counterweight buoyancy tanks partly or completely to lower the hull to an installed position.

\* \* \* \* \*